United States Patent
Kim et al.

(10) Patent No.: US 9,462,644 B2
(45) Date of Patent: Oct. 4, 2016

(54) POWER SUPPLY DEVICE

(71) Applicants: SAMSUNG ELECTRO-MECHANICS CO., LTD., Suwon-si (KR); SOLUM CO., LTD., Suwon-si (KR)

(72) Inventors: Jae Kuk Kim, Suwon-Si (KR); Hong Sun Park, Suwon-Si (KR)

(73) Assignees: SAMSUNG ELECTRO-MECHANICS CO., LTD., Suwon-si (KR); SOLUM CO., LTD., Suwon-si (KR)

( * ) Notice: Subject to any disclaimer, the term of this patent is extended or adjusted under 35 U.S.C. 154(b) by 0 days.

(21) Appl. No.: 14/585,189

(22) Filed: Dec. 30, 2014

(65) Prior Publication Data

US 2015/0237692 A1 Aug. 20, 2015

(30) Foreign Application Priority Data

Feb. 20, 2014 (KR) .................. 10-2014-0019706

(51) Int. Cl.
*H05B 33/08* (2006.01)
*H02M 1/42* (2007.01)

(52) U.S. Cl.
CPC ....... *H05B 33/0815* (2013.01); *H02M 1/4208* (2013.01); *Y02B 70/126* (2013.01)

(58) Field of Classification Search
USPC ............ 315/200 R, 201, 205, 247, 291, 294, 315/301, 307, 308, 312; 363/16, 21.01, 363/21.02, 21.12, 65, 67, 69, 89, 95
See application file for complete search history.

(56) References Cited

U.S. PATENT DOCUMENTS

| | | | | |
|---|---|---|---|---|
| 8,379,421 B2* | 2/2013 | Nishijima | ........... | H02M 1/4208 323/207 |
| 2010/0226149 A1* | 9/2010 | Masumoto | .......... | H02M 1/4225 363/20 |
| 2011/0080102 A1* | 4/2011 | Ge | ..................... | H05B 33/0815 315/200 R |
| 2012/0163036 A1* | 6/2012 | Kim | ................... | H02M 3/3378 363/17 |
| 2014/0049219 A1* | 2/2014 | Lee | ........................ | H02J 7/022 320/109 |

FOREIGN PATENT DOCUMENTS

| | | |
|---|---|---|
| KR | 10-2008-0002852 | 1/2008 |
| KR | 10-2008-0004704 A | 1/2008 |
| KR | 10-2009-0079097 A | 7/2009 |
| WO | 2006/102355 A2 | 9/2006 |

* cited by examiner

*Primary Examiner* — Thai Pham
(74) *Attorney, Agent, or Firm* — Sughrue Mion, PLLC

(57) ABSTRACT

A power supply device may include an insulating DC/DC converter unit including a primary winding and a secondary winding magnetically coupled to the primary winding, and inducing a voltage in the secondary winding in a first direction or a second direction, and a boosting unit. The boosting unit may comprise a first booster boosting the voltage induced in the secondary winding to supply power to a first light emitting diode module, in a first mode in which the voltage is induced in the secondary winding in the first direction, and a second booster boosting the voltage induced in the secondary winding to supply power to a second light emitting diode module, in a second mode in which the voltage is induced in the secondary winding in the second direction.

12 Claims, 5 Drawing Sheets

POWER SUPPLY DEVICE

CROSS-REFERENCE TO RELATED APPLICATION

This application claims the benefit of Korean Patent Application No. 10-2014-0019706 filed on Feb. 20, 2014, with the Korean Intellectual Property Office, the disclosure of which is incorporated herein by reference in its entirety.

BACKGROUND

The present disclosure generally relates to a power supply device used for driving, for example, but not limited to, a light emitting diode (LED).

As energy consumption has become a social issue, interest in efficient light sources has increased. Consequently, research into light emitting diodes (LEDs) capable of replacing existing cold cathode fluorescent lamps (CCFLs) has been actively undertaken. That is, by using the LED in a backlight unit, or the like, in a lighting device or a TV, an effort to overcome the inefficiency of existing CCFLs has been made.

In general, a plurality of individual LEDs, connected to each other in series or in parallel, may be used. Consequently, a user may adjust the brightness of emitted light according to a desired level thereof.

In addition, in order to reduce current deviation between LED strings, a separate current driver may be used in each string.

However, in the case of an LED driving device according to the related art, many elements may be used, and therefore a circuit structure may be relatively complex. In addition, in the case in which the respective drivers are used, it is also in efficient in view of energy.

Therefore, there is a need to improve an existing complex structure and introduce a more efficient LED driving device.

RELATED ART DOCUMENT

Patent Document (Patent Document 1) Korean Patent Laid-Open Publication No. 10-2008-0004704
(Patent Document 2) Korean Patent Laid-Open Publication No. 10-2009-0079097

SUMMARY

Some embodiments of the present disclosure may provide a light emitting diode (LED) power supply device having a simplified circuit structure.

Some embodiments of the present disclosure may provide a power supply device having a structure in which a power factor correcting unit, an insulating converter, and a boost converter are incorporated.

Some embodiments of the present disclosure may provide an LED power supply device having improved efficiency.

According to an aspect of the present disclosure, a power supply device may include: an insulating DC/DC converter unit including a primary winding and a secondary winding magnetically coupled to the primary winding, and inducing a voltage in the secondary winding in a first direction or a second direction; and a boosting unit. The boosting unit may include a first booster boosting the voltage induced in the secondary winding to supply power to a first light emitting diode module, in a first mode in which the voltage may be induced in the secondary winding in the first direction, and a second booster boosting the voltage induced in the secondary winding to supply power to a second light emitting diode module, in a second mode in which the voltage may be induced in the secondary winding in the second direction.

The boosting unit may include a common inductor having one end connected to one end of the secondary winding in series.

The boosting unit may include a first switching element and a first diode connected to the other end of the secondary winding.

The boosting unit may include a second switching element and a second diode connected to the other end of the common inductor.

The first booster may comprise a first boost converter including the common inductor, the first switching element, and the first diode.

The second booster may comprise a second boost converter including the common inductor, the second switching element, and the second diode.

The common inductor may correct a power factor.

The insulating DC/DC converter unit may include a half-bridge DC/DC converter or a full-bridge DC/DC converter.

The power supply device may further include a controlling unit controlling the insulating DC/DC converter unit and the boosting unit.

The controlling unit may control the first switching element in the first mode.

The controlling unit may control the second switching element in the second mode.

The half-bridge DC/DC converter may include a third switching element and a fourth switching element. The controlling unit may turn off the third switching element, turn on the fourth switching element after a first predetermined period of time, turn off the fourth switching element, and turn on the third switching element after a second predetermined period of time. The second predetermined period of time may be the same as or different from the first predetermined period of time.

According to another aspect of the present disclosure, a power supply device may include: an insulating DC/DC converter unit including a primary winding and a secondary winding magnetically coupled to the primary winding, and inducing a voltage in the secondary winding in a first direction or a second direction; a common inductor connected to the secondary winding in series and performing a power factor correcting function; a first boost converter including a first switching element controlling accumulation or discharging of energy in the common inductor and boosting a voltage induced in the secondary winding in a first mode in which the voltage is induced in the secondary winding in a first direction; and a second boost converter including a second switching element controlling accumulation or discharging of energy in the common inductor and boosting a voltage induced in the secondary winding in a second mode in which the voltage is induced in the secondary winding in a second direction.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
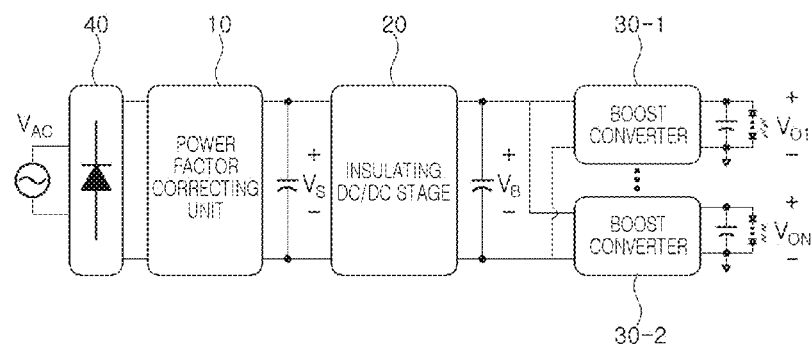
FIG. 1 is a diagram illustrating an example of a light emitting device (LED) driving device.

Hereinafter, embodiments in the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

Throughout the drawings, the same or like reference numerals will be used to designate the same or like elements.

FIG. 1 is a diagram illustrating an example of a light emitting device (LED) driving device.

Referring to FIG. 1, the LED driving device may include a rectifying unit 40, a power factor correcting unit 10, an insulating direct current to direct current (DC/DC) stage 20, and at least two or more boost converters 30-1 and 30-2.

The rectifying unit 40 may rectify input power $V_{AC}$ and transfer the rectified input power $V_{AC}$ to the power factor correcting unit 10.

The power factor correcting unit 10 may perform power factor correction on the input power $V_{AC}$ and transfer the input power $V_{AC}$ having been subjected to the power factor correction to the insulating DC/DC stage 20. Therefore, the power factor correcting unit 10 may include a power factor corrector.

For example, the power factor correcting unit 10 may convert an alternating current voltage $V_{AC}$ into a direct current voltage $V_S$ having a preset magnitude, and provide the direct current voltage $V_S$ to the insulating DC/DC stage 20.

A capacitor for, for example, but not limited to, stabilizing power may be provided between an input stage 10 and the insulating DC/DC stage 20.

The insulating DC/DC stage 20 may convert the direct current voltage $V_S$ into a direct current voltage $V_B$ having a preset magnitude, and transfer the direct current voltage $V_B$ to the boost converters 30-1 and 30-2.

Additionally, a capacitor for, for instance, but not limited to, stabilizing power may be provided between the insulating DC/DC stage 20 and the boost converters 30-1 and 30-2.

The boost converters 30-1 and 30-2 may output output voltages higher than the input voltage by a switching control. That is, the boost converters 30-1 and 30-2 may transfer a voltage higher than the direct current voltage $V_B$ to output loads, for example, the respective LED strings.

Since a method of controlling the boost converter 30-1 or 30-2 is apparent to those skilled in the art, a detailed description thereof will be omitted in this specification.

Specifically, the boost converter 30-1 may transfer a voltage higher than the direct current voltage $V_B$ to a first LED string. In addition, the boost converter 30-2 may transfer a voltage higher than the direct current voltage $V_B$ to a second LED string.

Similar to those described above, a capacitor for, for example, but not limited to, stabilizing power may be further provided between the boost converters 30-1 and 30-2 and the LED strings.

Since the LED driving device as described above is configured in three stages by the power factor correcting unit 10, the insulating DC/DC stage 20, and the boost converters 30-1 and 30-2, it may have a complex circuit structure. Moreover, a hard switching problem caused by the boost converters 30-1 and 30-2 may reduce the overall efficiency of the driving device and may aggravate an electromagnetic interference problem.

Figure 2:
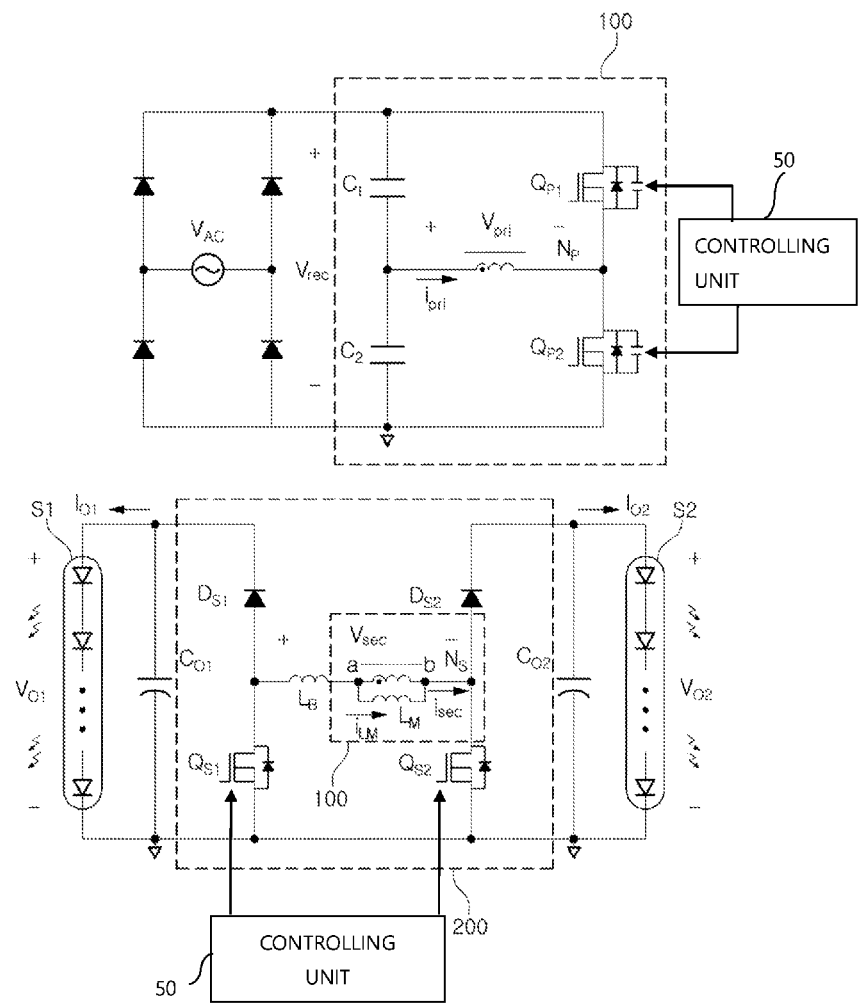
FIG. 2 is a diagram illustrating a power supply device according to an exemplary embodiment in the present disclosure.

FIG. 2 is a diagram illustrating a power supply device according to an exemplary embodiment in the present disclosure.

The power supply device according to an exemplary embodiment in the present disclosure may supply power to one or more LED strings using an output from the rectifying unit 40 in the LED driving device illustrated in FIG. 1.

The power supply device according to an exemplary embodiment in the present disclosure may have a structure in which the power factor correcting unit 10, the insulating DC/DC stage 20, and the boost converters 30-1 and 30-2 illustrated in FIG. 1 are incorporated.

Referring to FIG. 2, the power supply device according to an exemplary embodiment in the present disclosure may include an insulating DC/DC converter unit 100 and a boosting unit 200.

The insulating DC/DC converter unit 100 may include a primary winding $N_p$ and a secondary winding $N_s$ magnetically coupled to the primary winding $N_p$. In addition, the secondary winding $N_s$ may have a voltage induced in a first direction or a second direction by a voltage across the primary winding $N_p$.

For example, the insulating DC/DC converter unit 100 may be implemented as a half-bridge DC/DC converter or a full-bridge DC/DC converter.

In the present specification, a description will be made based on the half-bridge DC/DC converter for convenience of explanation. However, it may be easily appreciated by those skilled in the art that a configuration according to an exemplary embodiment in the present disclosure described in the present specification may be applied to the full-bridge DC/DC converter.

The insulating DC/DC converter unit 100 may include a third switch $Q_{p1}$, a fourth switch $Q_{p2}$, a first capacitor $C_1$, a second capacitor $C_2$, a primary winding $N_p$, and a secondary winding $N_s$.

As illustrated in FIG. 2, the third switch $Q_{p1}$ and the fourth switch $Q_{p2}$ may be connected to each other in series. In addition, the first capacitor $C_1$ and the second capacitor $C_2$ may be connected to each other in series. In addition, the primary winding $N_p$ may be connected between a node between the first capacitor $C_1$ and the second capacitor $C_2$, and a node between the third switch $Q_{p1}$ and the fourth switch $Q_{p2}$.

The third switch $Q_{p1}$ and the fourth switch $Q_{p2}$ of the insulating DC/DC converter unit 100 may be controlled so that current flows alternately in both directions in the primary winding $N_p$.

The first capacitor $C_1$ and the second capacitor $C_2$ may be connected to an input power terminal in parallel with each other, and may divide input power $V_{rec}$ and store the divided input power.

The third switch $Q_{p1}$ and the fourth switch $Q_{p2}$ may alternately supply charges respectively stored in the first capacitor $C_1$ or the second capacitor $C_2$ to both sides of the primary winding $N_p$.

That is, the switches $Q_{p1}$ and $Q_{p2}$ may be alternately 'turned-on', thereby allowing the current to flow in different directions in the primary winding $N_p$.

The boosting unit 200 may include a first booster boosting a voltage induced in the secondary winding $N_s$ and supplying power to a first light emitting diode module S1, in a first mode in which the voltage is induced in the secondary winding $N_s$ in a first direction.

The first direction may be defined as, for example, but not limited to, a state in which a positive electrode is induced in one end a of the secondary winding $N_s$ and a negative electrode is induced in the other end b of the secondary winding $N_s$.

As illustrated in FIG. 2, the boosting unit 200 may include a common inductor $L_B$ connected to the secondary winding $N_s$ in series. The common inductor $L_B$ has one end which may be connected to one end a of the secondary winding $N_s$.

In addition, the boosting unit 200 may include a first switch $Q_{s1}$ and a first diode $D_{s1}$ connected to the other end of the common inductor $L_B$.

Further, the boosting unit 200 may include a second switch $Q_{s2}$ and a second diode $D_{s2}$ connected to the other end of the secondary winding $N_s$.

The first booster may be a first boost converter including the common inductor $L_B$, the first switch $Q_{s1}$, and the first diode $D_{s1}$.

The boosting unit 200 may further include a second booster boosting a voltage induced in the secondary winding $N_s$ and supplying power to a second light emitting diode module S2, in a second mode in which the voltage is induced in the secondary winding $N_s$ in a second direction.

The second direction may be defined as, for instance, but not limited to, a state in which a positive electrode is induced in the other end b of the secondary winding $N_s$ and a negative electrode is induced in one end a of the secondary winding $N_s$.

The second booster may be a second boost converter including the common inductor $L_B$, the second switch $Q_{s2}$, and the second diode $D_{s2}$.

The common inductor $L_B$ may perform a power factor correcting function in the first mode or the second mode.

According to an exemplary embodiment in the present disclosure, the power supply device may include a controlling unit 50 controlling the first switch $Q_{s1}$, the second switch $Q_{s2}$, the third switch $Q_{p1}$, and the fourth switch $Q_{p2}$.

In addition, the boosting unit 200 may control currents of the light emitting diode modules S1 and S2.

Hereinafter, an operational principle of the power supply device according to an exemplary embodiment in the present disclosure will be described in detail with reference to FIGS. 3 and 4.

Figure 3:
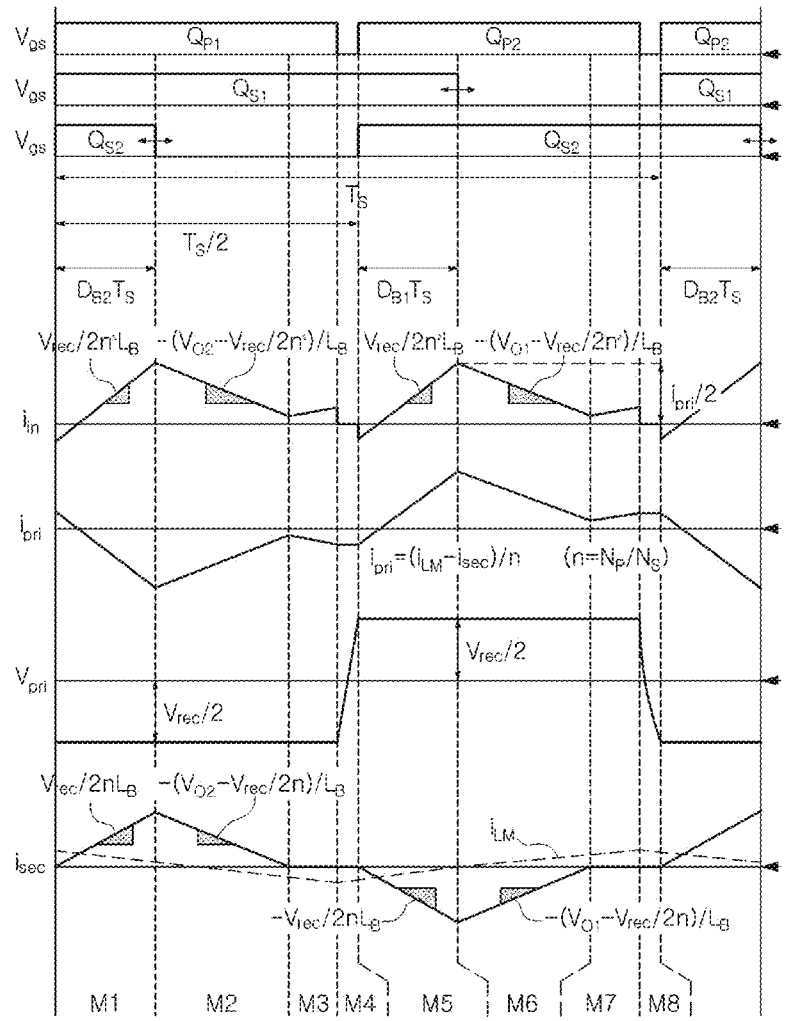
FIG. 3 is a diagram illustrating exemplary operation waveforms of some components of the power supply device.

FIG. 3 is a diagram illustrating exemplary operation waveforms of some components of the power supply device.

Figure 4A:
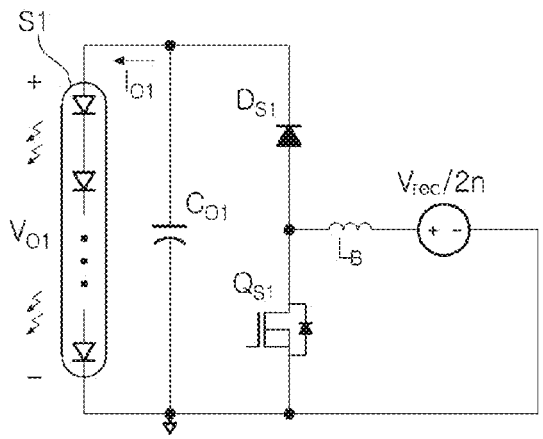
FIGS. 4A and 4B are diagrams illustrating operating states of a boosting unit in a first mode and a second mode of the power supply device.
Figure 4B:
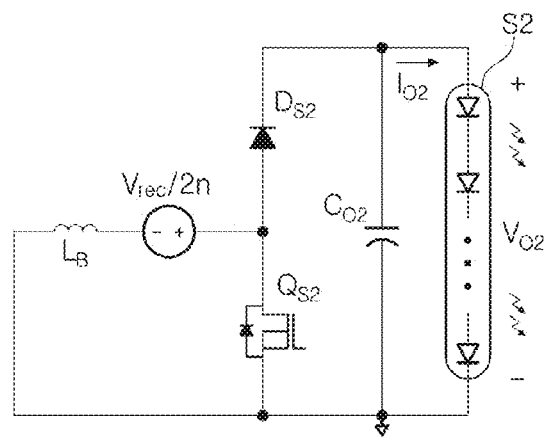

FIGS. 4A and 4B are diagrams illustrating operating states of a boosting unit in a first mode and a second mode of the power supply device. FIG. 4A is a diagram illustrating the operating state of the boosting unit in the first mode. FIG. 4B is a diagram illustrating the operating state of the boosting unit in the second mode.

Referring to FIGS. 3 and 4B, in the second mode, a circuit operation may be generally divided into a first section M1, a second section M2, a third section M3, and a fourth section M4.

In the present exemplary embodiment, a single period of operation of the power supply device is defined as Ts.

The second mode may be maintained for Ts/2. In addition, the first mode may be maintained for Ts/2.

A duty ratio of the second switching element $Q_{S2}$ in the second mode may be defined as $D_{B2}$.

In addition, a duty ratio of the first switching element $Q_{S1}$ in the first mode may be defined as $D_{B1}$.

1. First Section M1—$Q_{S2}$: TURN ON, $Q_{P1}$, $Q_{S1}$: TURN ON

The controlling unit 50 may turn on the third switching element $Q_{P1}$ and the first switching element $Q_{S1}$, in the first section M1.

By turning on the third switching element $Q_{P1}$, a voltage $V_{pri}$ of the primary winding $N_p$ may be a half of the input voltage $V_{rec}$.

In addition, a primary current $i_{pri}$ flowing through the third switching element $Q_{P1}$, the first capacitor $C_1$, the primary winding $N_p$ may be varied to a predetermined gradient.

When the first switching element $Q_{S1}$ is turned on, a voltage of the secondary winding $N_s$ may be $V_{rec}/2n$ according to a turns ratio (n:1), and subsequently, a current $i_{sec}$ flowing in the secondary winding $N_s$ may be increased at a gradient of $(V_{rec}/2n)/L_B$.

In addition, the primary current $i_{pri}$ may be determined by the current $i_{sec}$ flowing in the secondary winding $N_s$, and an input current $i_{in}$ may be generated by the primary current $i_{pri}$. That is, since the gradient of the current $i_{sec}$ flowing in the secondary winding $N_s$ may be proportional to the input voltage $V_{rec}$ and perform a DCM operation, the waveform of the input current $i_{in}$ may appear a form following an input AC voltage.

In this case, since the input current $i_{in}$ appears the form following the input voltage, a power factor correcting function may be performed by the power supply device according to an exemplary embodiment in the present disclosure.

In the first section M1, energy may be accumulated in the common inductor $L_B$.

2. Second Section M2—$Q_{P1}$, $Q_{S1}$: TURN ON, $Q_{S2}$: TURN OFF

The controlling unit 50 may turn off the second switching element $Q_{S2}$, in the second section M2.

By turning off the second switching element $Q_{S2}$, a voltage of $V_{O2}$ may be applied to the secondary winding $N_s$ and the common inductor $L_B$.

Meanwhile, as the second switching element $Q_{S2}$ is turned off, the current $i_{sec}$ flowing in the secondary winding $N_s$ may be decreased at a gradient of $-(V_{O2}-V_{rec}/2n)/L_B$.

In the second section M2, the energy, accumulated in the common inductor $L_B$ in the first section M1, may be emitted to thereby supply driving power to a second LED string S2.

3. Third Section M3—$Q_{P1}$, $Q_{S1}$: TURN ON, $Q_{S2}$: TURN OFF

As the switching state in the second section is continued, the current $i_{sec}$ flowing in the secondary winding $N_s$ may become zero (0).

That is, according to an exemplary embodiment in the present disclosure, in the third section M3, the power supply device may perform the DCM operation.

4. Fourth Section M4—$Q_{P1}$: TURN OFF, $Q_{S1}$: TURN ON, $Q_{S2}$: TURN OFF

The controlling unit 50 may turn off the third switching element $Q_{P1}$, in the fourth section M4.

In addition, after a predetermined period of time lapses, the controlling unit 50 may turn on the fourth switching element $Q_{P2}$.

Referring to FIGS. 3 and 4B, by the method described above, the power supply device may supply the driving power to the second LED string S2.

In addition, the primary current $i_{pri}$ may be determined by the current $i_{sec}$ flowing in the secondary winding $N_s$, and an input current $i_{in}$ may be generated by the primary current $i_{pri}$. In this case, since the input current $I_{in}$ appears in the form following the input voltage, a power factor correcting function may be performed by the power supply device according to an exemplary embodiment in the present disclosure.

In addition, referring to FIGS. 3 and 4A, in the first mode, the respective sections of the circuit operation may be generally divided into a fifth section M5, a sixth section M6, a seventh section M7, and an eighth section M8.

Referring to FIGS. 4A and 4B, since the method for controlling the power supply device in the first mode may be similar to the method for controlling power supply device in the first mode described above, except that the first switching element $Q_{S1}$ is used instead of the second switching element $Q_{S2}$, the first diode $D_{S1}$ is used instead of the second diode $D_{S2}$, and a polarity of a voltage induced in the secondary winding $N_s$ is changed, a detailed description of an operation in the first mode will be omitted.

Referring to FIGS. 3 and 4A, by the method described above, the power supply device may supply the driving power to the first LED string S1.

Figure 5:
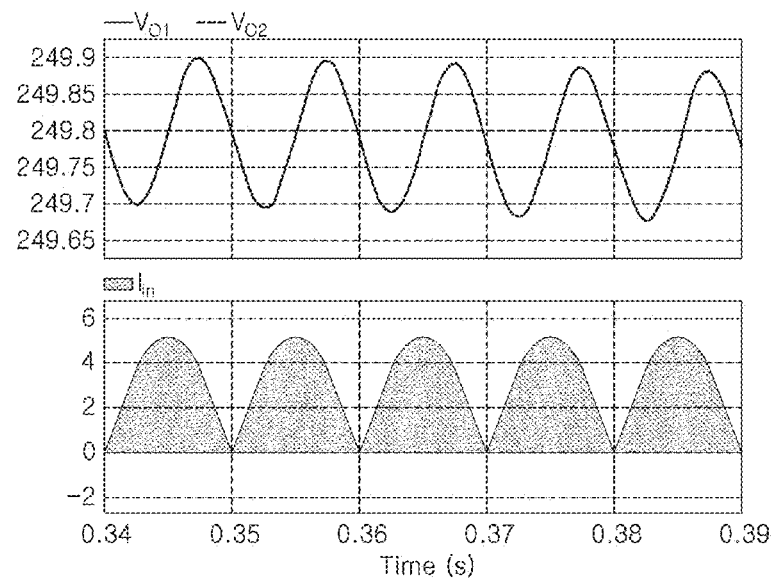
FIGS. 5 and 6 are diagrams illustrating input and output waveforms of the power supply device according to an exemplary embodiment in the present disclosure.
Figure 6:
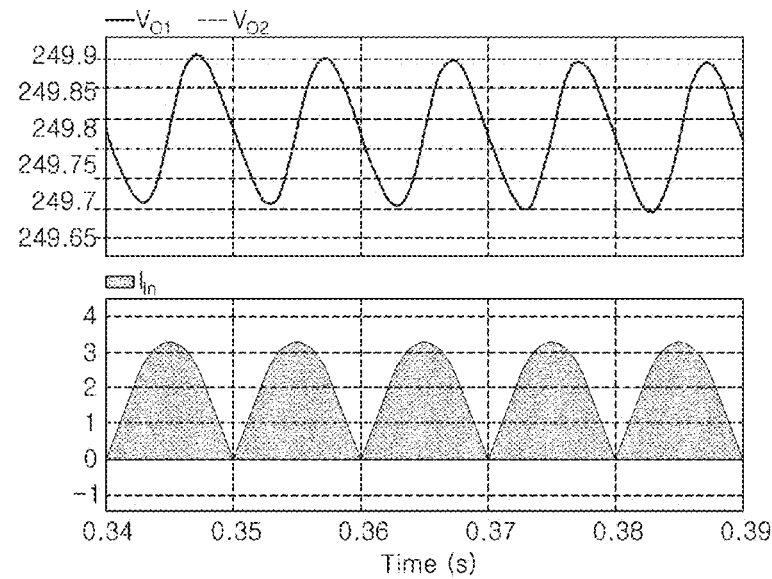

FIGS. 5 and 6 are diagrams illustrating input and output waveforms of the power supply device according to an exemplary embodiment in the present disclosure.

FIG. 5 is a diagram illustrating an input of $90V_{ac}$, a waveform of the input current $I_{in}$ in an output environment of 150V/0.3 A and 2-channel, and output voltages $V_{o1}$ and $V_{o2}$.

FIG. 6 is a diagram illustrating an input of $264V_{ac}$, a waveform of the input current $I_{in}$ in an output environment of 150V/0.3 A and 2-channel, and output voltages $V_{o1}$ and $V_{o2}$.

As seen in FIGS. 5 and 6, the power factor correcting function may be performed in the power supply device according to an exemplary embodiment in the present disclosure.

As such, since the power supply device according to an exemplary embodiment in the present disclosure uses the structure in which the power factor correcting unit, the insulating DC/DC converter, and the boost converter are incorporated, it may have simple configuration of the LED driving device using less components.

In addition, the common inductor $L_B$ performing the power factor correcting function may be used in a plurality of boost converters. Therefore, the LED driving device may be simply configured using less components.

In addition, according to an exemplary embodiment in the present disclosure, a current $i_{Lm}$ flowing in a parasitic inductor $L_m$ of the secondary winding $N_s$ may perform freewheeling before each switching element is turned on. Therefore, each switching element may perform a zero voltage switching (ZVS) (see the fourth section M4 and the eighth section M8 of FIG. 3).

The power supply device according to an exemplary embodiment in the present disclosure may, for example, but not limited to, perform the zero voltage switching for all switching elements and may solve a hard switching problem caused by an existing boost converter. Therefore, the power supply device according to an exemplary embodiment in the present disclosure may improve efficiency and alleviate an EMI load at the same time.

As set forth above, according to exemplary embodiments in the present disclosure, the LED power supply device having the simplified circuit structure may be provided.

In addition, the power supply device may have the structure in which the power factor correcting unit, the insulating converter, and the boost converter are incorporated.

The power supply device may have improved efficiency.

While exemplary embodiments have been shown and described above, it will be apparent to those skilled in the art that modifications and variations could be made without departing from the scope of the invention as defined by the appended claims.

What is claimed is:

1. A power supply device comprising:
    an insulating DC/DC converter unit including a primary winding and a secondary winding magnetically coupled to the primary winding, and inducing a voltage in the secondary winding in a first direction or a second direction: and
    a boosting unit including a first booster boosting the voltage induced in the secondary winding to supply power to a first light emitting diode module, in a first mode in which the voltage is induced in the secondary winding in the first direction, and a second booster boosting the voltage induced in the secondary winding to supply the power to a second light emitting diode module, in a second mode in which the voltage is induced in the secondary winding in the second direction,
    wherein the boosting unit further includes a common inductor having one end connected to one end of the secondary winding in series,
    wherein the boosting unit further includes a first switching element and a first diode connected to another end of the secondary winding, and
    wherein the first switching element performs a zero voltage switching in response to freewheeling performed by a current flowing in a parasitic inductor of the secondary winding.

2. The power supply device of claim 1, wherein the boosting unit further includes a second switching element and a second diode connected to an other end of the common inductor.

3. The power supply device of claim 2, wherein the second booster comprises a second boost converter including the common inductor, the second switching element, and the second diode.

4. The power supply device of claim 2, wherein the insulating DC/DC converter unit includes a half-bridge DC/DC converter.

5. The power supply device of claim 4, further comprising a controlling unit controlling the insulating DC/DC converter unit and the boosting unit.

6. The power supply device of claim 5, wherein the controlling unit controls the first switching element in the first mode.

7. The power supply device of claim 5, wherein the controlling unit controls the second switching element in the second mode.

8. The power supply device of claim 5, wherein the half-bridge DC/DC converter includes a third switching element and a fourth switching element, and
    the controlling unit turns off the third switching element, turns on the fourth switching element after a first predetermined period of time, turns off the fourth switching element, and turns on the third switching element after a second predetermined period of time.

9. The power supply device of claim 2, wherein the insulating DC/DC converter unit comprises a full-bridge DC/DC converter.

10. The power supply device of claim 1, wherein the first booster comprises a first boost converter including the common inductor, the first switching element, and the first diode.

11. The power supply device of claim 1, wherein the common inductor corrects a power factor.

12. A power supply device comprising:
an insulating DC/DC converter unit including a primary winding and a secondary winding magnetically coupled to the primary winding, and inducing a voltage in the secondary winding in a first direction or a second direction;
a common inductor connected to the secondary winding in series and configured to correct a power factor;
a first boost converter including a first switching element controlling accumulation or discharging of energy in the common inductor and boosting a voltage induced in the secondary winding in a first mode in which the voltage is induced in the secondary winding in a first direction; and
a second boost converter including a second switching element controlling accumulation or discharging of the energy in the common inductor and boosting a voltage induced in the secondary winding in a second mode in which the voltage is induced in the secondary winding in a second direction,
wherein the first switching element or the second switching element performs a zero voltage switching in response to freewheeling performed by a current flowing in a parasitic inductor of the secondary winding.

* * * * *